(12) United States Patent
Betz (10) Patent No.: US 10,731,870 B2
(45) Date of Patent: Aug. 4, 2020

(54) HEAT PUMP NETWORK

(71) Applicant: Basic Holdings, Cloghran, Co. Dublin (IE)

(72) Inventor: Martin Betz, Annagassan (IE)

(73) Assignee: Basic Holdings, Cloghran Co., Dublin (IE)

( * ) Notice: Subject to any disclaimer, the term of this patent is extended or adjusted under 35 U.S.C. 154(b) by 50 days.

(21) Appl. No.: 15/772,925

(22) PCT Filed: Nov. 3, 2016

(86) PCT No.: PCT/EP2016/076479
§ 371 (c)(1),
(2) Date: May 2, 2018

(87) PCT Pub. No.: WO2017/076936
PCT Pub. Date: May 11, 2017

(65) Prior Publication Data
US 2018/0320907 A1    Nov. 8, 2018

(30) Foreign Application Priority Data

Nov. 3, 2015    (GB) .................................. 1519448.3
Jan. 18, 2016   (GB) .................................. 1600898.9

(51) Int. Cl.
*F24D 11/02*    (2006.01)
*F25B 13/00*    (2006.01)
(Continued)

(52) U.S. Cl.
CPC .......... *F24D 11/0207* (2013.01); *F24D 10/00* (2013.01); *F24D 19/1039* (2013.01);
(Continued)

(58) Field of Classification Search
CPC .. F24D 11/0207; F24D 10/00; F24D 2200/32; F25B 25/005; F25B 2400/06; F25B 2400/24
See application file for complete search history.

(56) References Cited

U.S. PATENT DOCUMENTS 3,996,759 A * 12/1976 Meckler ................ F24F 5/0046
                                                          62/170
4,034,912 A *  7/1977 Hayes ................... F24D 11/003
                                                          126/587
(Continued)

FOREIGN PATENT DOCUMENTS

CH           625038 A5    8/1981
DE     202012103891 U1    1/2013
(Continued)

OTHER PUBLICATIONS

Combined Search and Examination Report under Sections 17 and 18(3) issued in connection with GB 1519448.3, dated Feb. 1, 2016.
(Continued)

*Primary Examiner* — Steven B McAllister
*Assistant Examiner* — Daniel E. Namay
(74) *Attorney, Agent, or Firm* — Kusner & Jaffe (57) ABSTRACT

A distributed heating network comprising a plurality of individual heat pumps. Each heat pump is individually coupled to a common heat source of the network, the common heat source of the network comprising a liquid loop within the network, the liquid of the loop being maintained at close to ambient temperature through active heat management of the common heat source. The common heat source is further coupled to at least one energy source. A controller is configure to thermally decouple the energy source from the heat.

18 Claims, 9 Drawing Sheets

(51) Int. Cl.
*F25B 25/00* (2006.01)
*F24D 10/00* (2006.01)
*F25B 30/06* (2006.01)
*F25D 17/02* (2006.01)
*F24D 19/10* (2006.01)

(52) U.S. Cl.
CPC ............ *F25B 13/00* (2013.01); *F25B 25/005* (2013.01); *F25B 30/06* (2013.01); *F25D 17/02* (2013.01); *F24D 2200/11* (2013.01); *F24D 2200/12* (2013.01); *F24D 2200/13* (2013.01); *F24D 2200/14* (2013.01); *F24D 2200/32* (2013.01); *F25B 2339/047* (2013.01); *F25B 2400/06* (2013.01); *F25B 2400/24* (2013.01); *Y02B 30/17* (2018.05); *Y02E 20/14* (2013.01)

(56) References Cited

U.S. PATENT DOCUMENTS

| | | | |
|---|---|---|---|
| 4,522,253 A | 6/1985 | Levin | |
| 4,924,681 A | 5/1990 | DeVit et al. | |
| 4,949,547 A | 8/1990 | Shimizu | |
| 2004/0129002 A1* | 7/2004 | Huengerle | F01K 17/025 60/772 |
| 2007/0007212 A1* | 1/2007 | Harley | F24D 3/00 210/698 |
| 2007/0246555 A1* | 10/2007 | Nishimura | F24D 3/08 237/2 B |
| 2008/0044698 A1* | 2/2008 | Park | F24D 10/00 429/414 |
| 2012/0090559 A1* | 4/2012 | Yan | F24D 17/0031 122/14.2 |
| 2012/0152514 A1 | 6/2012 | Takasaki et al. | |
| 2012/0210732 A1 | 8/2012 | Hoehmann et al. | |
| 2012/0279681 A1* | 11/2012 | Vaughan | F24D 10/003 165/62 |
| 2013/0091891 A1* | 4/2013 | Hinde | F25B 43/02 62/470 |
| 2013/0284818 A1 | 10/2013 | Hayashida et al. | |
| 2015/0060007 A1 | 3/2015 | Smith | |
| 2015/0142192 A1 | 5/2015 | Moreau | |
| 2016/0123638 A1* | 5/2016 | Kimura | F24F 11/89 62/189 |
| 2016/0245565 A1* | 8/2016 | Mortz | B23P 19/00 |
| 2016/0363356 A1* | 12/2016 | Hinde | F25B 43/02 |
| 2017/0336119 A1* | 11/2017 | McDonough | F25B 25/005 |
| 2018/0073782 A1* | 3/2018 | Hatanaka | F25B 5/02 |

FOREIGN PATENT DOCUMENTS

| | | | | |
|---|---|---|---|---|
| EP | 1978183 A2 | | 10/2008 | |
| EP | 2148143 A2 | | 1/2010 | |
| GB | 2502341 A | | 11/2013 | |
| JP | S61-153434 A | | 7/1986 | |
| JP | 2013092299 A | * | 5/2013 | ......... F24D 19/1048 |
| JP | 2013119973 A | * | 6/2013 | ......... F24D 19/1009 |
| JP | 2013155988 A | * | 8/2013 | ............ F24D 10/00 |
| KR | 10-0998483 B1 | | 12/2010 | |
| WO | WO 01/20234 A1 | | 3/2001 | |
| WO | WO 03/038353 A1 | | 5/2003 | |
| WO | WO 2009/139699 A1 | | 11/2009 | |
| WO | WO 2010/145040 A1 | | 12/2010 | |

OTHER PUBLICATIONS

Search Report under Section 17(6) issued in connection with GB 1519448.3, dated Feb. 26, 2016.
Combined Search and Examination Report under Sections 17 and 18(3) issued in connection with GB 1600898.9, dated Aug. 4, 2016.
International Search Report and Written Opinion from corresponding International Patent Application No. PCT/EP2016/076479, dated May 23, 2017.
International Preliminary Report on Patentability from corresponding International Patent Application No. PCT/EP2016/076479, dated Oct. 31, 2017.

* cited by examiner

HEAT PUMP NETWORK

FIELD

The present application relates to heat pumps and in particular to a distributed heat pump network used in a district heating architecture.

BACKGROUND

Heat pumps are well known in the art and can be defined as any device that provides heat energy from a source of heat to a destination called a "heat sink". Heat pumps are designed to move thermal energy opposite to the direction of spontaneous heat flow by absorbing heat from a cold space and releasing it to a warmer one. A heat pump uses some amount of external power to accomplish the work of transferring energy from the heat source to the heat sink. By definition, all heat sources for a heat pump must be colder in temperature than the space to be heated. Most commonly, heat pumps draw heat from the air (outside or inside air) or from the ground.

It is known to use heat pumps as a source of heat for heating an air space such as within a building or as a source of heating for domestic hot water. Typically a single heat pump will be connected to a single source and then the output from that heat pump is selectively used to transfers heat to air inside a building or transfer heat to a heating circuit and a tank of domestic hot water.

Known applications of heat pumps include their use in district heating. District heating is a system for distributing heat generated in a centralized location for residential and commercial heating requirements such as space heating and water heating. The heat is often obtained from a cogeneration plant burning fossil fuels but increasingly also biomass, although heat-only boiler stations, geothermal heating, heat pumps and central solar heating are also used, as well as nuclear power. District heating plants can provide higher efficiencies and better pollution control than localized boilers. Despite these advantages, there continues to exist a need for improvement in district heating architectures.

Furthermore, typically heat pumps are coupled to a single heat source—i.e. they are dedicated for use with one type of environment, be that an air source heat pump, a ground source etc. The efficiency of these heat pumps is predicated on the environment on which they are based being useable as a source of energy at the time when the heat pump operation is required.

SUMMARY

To address these and other needs, the present teaching provides, in a first aspect, a distributed heating network comprising a plurality of individual heat pumps.

In a second aspect, the present teaching provides a heat pump coupled to a common heat source that may be selectively coupled to individual sources of energy for the heat pump. These individual sources of energy are desirably distinct and separate sources of energy. The common heat source may be configured to allow a concurrent coupling of two or more of the individual sources of energy into the common heat source. Examples of these individual sources of energy include solar thermal panels, air heat exchangers, PVT panels, ground water loops and the like. The heat pump may also be coupled to direct electrical sources such as PVT panels, the electricity grid or the like. The heat pump may also be coupled to a distributed heating network comprising a plurality of individual heat pumps. In such an arrangement each heat pump of the distributed heating network may be individually coupled to the common heat source, each of the individual heat pumps being arranged to independently provide or extract heat from the common heat source.

In a first arrangement the common heat source is a water based circuit. Examples of same include pure water, water with salt additives such as brine or water with various anti-freeze components.

Where a single heat pump is provided, or a plurality of heat pumps are provided, then at least one of the heat pumps may be coupled to a dedicated tank of domestic hot water such that a heat from that heat pump is used to provide a heating of water within that dedicated tank. The heat pump may be configured to provide a plurality of modes. The heat pump may be provided as a reversible heat pump. One or more of the heat pumps may be provided with a variable output.

In a first mode, an individual heat pump is configured to use the common heat source to provide hot water which is then stored in the dedicated tank. In a second mode, the heat pump may be used to provide space heating whereby the heat pump is configured to use the common heat source to provide a source of heat for a dedicated heating circuit- such as a radiator circuit. In a third mode, the heat pump may be configured to provide localized cooling through one or more fan coils, use of underfloor heating or the like. The heat that is generated by that localized cooling can be used to effect a heating of hot water for storage within the dedicated tank. In such an arrangement, if the volume of hot water generated is sufficient for the storage purposes then the excess heat can be diverted back into the common heat source.

Where provided in a distributed network, by providing a plurality of such heat pumps which have independent connections to the common heat source, excess heat from one heat pump can be diverted back into the common heat source circuit where it can be used as a source of heat for another different heat pump.

The architecture may also include one or more buffer or heat sink modules which can be used to divert excess heat from the common heat source. Examples include cold stores, warm stores, chillers and the like.

The architecture may comprise one or more heat source components such as a ground source array, gas or oil boilers, CHP plants, biomass boilers, air source heat pumps or the like which are coupled to the common heat source. Additionally, the network may be extended to allow connection to a wide area district heat network such as that provided within the context of a larger city or community wide district heating network.

Accordingly, a first embodiment of the application provides a heat pump as detailed in the claims presented herein. Advantageous embodiments are provided in the dependent claims. The present teaching also provides a heat pump network as detailed in the independent claim directed thereto.

Accordingly, a first embodiment of the application provides a heat pump as detailed in claim 1. Advantageous embodiments are provided in the dependent claims. The present teaching also provides a heat pump network as detailed in the independent claim directed thereto.

BRIEF DESCRIPTION OF THE DRAWINGS

The present application will now be described with reference to the accompanying drawings in which.

DETAILED DESCRIPTION OF THE DRAWINGS

FIGS. 1 to 4 are exemplary schematics of a district heating architecture in accordance with the present teaching. In the examples shown, an apartment building 100 comprises a plurality of individual dwellings 101a . . . 101h. Within each dwelling is provided an individual heat pump 110a . . . 110h. Each of the individual heat pumps 110a . . . 110h, are individually coupled to a common heat source 120 which is typically provided in the form of a water circuit.

As a result of providing the plurality of heat pumps individually coupled to the heat source 120, each of the individual heat pumps can independently provide or extract heat from the common heat source 120. The heat source is maintained at or close to ambient temperature.

As is shown in the schematics of FIGS. 5 to 8, each of the individual heat pumps 110 may be coupled to a dedicated tank of domestic hot water 500 such that heat from that heat pump is used to provide a heating of water within that dedicated tank 500. Each of the heat pumps 110 may also be coupled to a local heating or cooling circuit 510.

By providing a plurality of such heat pumps 110 which have independent connections to the common heat source, excess heat from one heat pump can be diverted back into the common heat source circuit where it can be used as a source of heat for another different heat pump.

The architecture may also include one or more buffer or heat sink modules which can be used to divert excess heat from the common heat source 120. Examples include cold stores 130, warm stores 140, chillers 150 and the like.

The architecture may comprise one or more heat source components such as a ground source array 160, gas or oil boilers 170, CHP plants 180, biomass boilers 190, air source heat pumps 200 or the like which are coupled to the common heat source 120. The ground source array may be coupled to a ground source heat pump 165. These heat source components define one or more energy sources which provide energy to the common heat source. The temperature of the common heat source fluid loop is independent of or thermally decoupled from the energy provided by these energy sources. In this way the common heat source thermally decouples the energy sources from the plurality of heat pumps.

The individual heat pumps may be configured to provide a plurality of modes. The heat pump may be provided as a reversible heat pump.

Figure 6:
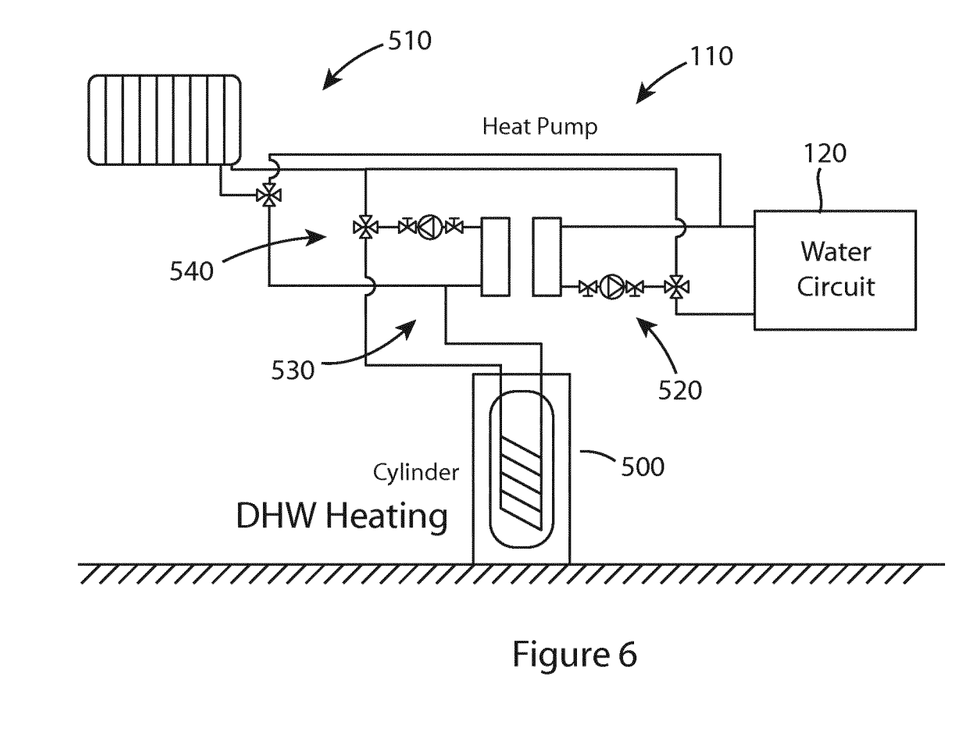
FIG. 6 is a schematic showing a plumbing network of an individual heat pump per the arrangement of FIG. 1, as coupled to a local load per the present teaching to provide domestic hot water to a local cylinder.

In a first mode as shown in FIG. 6, an individual heat pump 110 is configured to use the common heat source 120 to provide hot water which is then stored in the dedicated tank or cylinder 500. In this arrangement a valving configuration is used to direct cool water from the common heat source 120 through an evaporator component 520 of the heat pump. Per conventional operation of a heat pump, this flow of cool water through the evaporator can be used in a heat exchanger to provide a source of hot water on a condenser loop 530 of the heat pump. This hot water is then fed through a coil within the cylinder to effect a heating of the water contained therein to temperatures in excess of 55° to avoid possibilities of legionella. In this configuration, the valve circuitry (shown as a three way valve 540 in this example) is switched to avoid circulation through the space heating/cooling loop 510.

Figure 7:
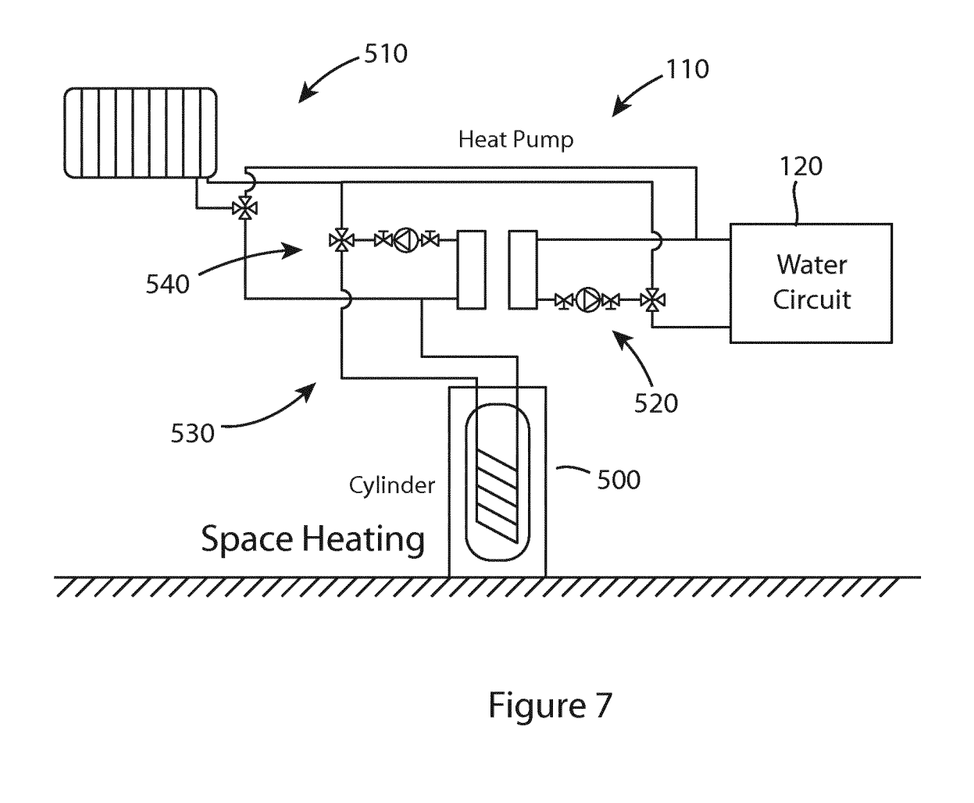
FIG. 7 is a schematic showing a plumbing network of an individual heat pump per the arrangement of FIG. 1, as coupled to a local load per the present teaching to provide domestic space heating.

In a second mode shown in FIG. 7, the heat pump may be used to provide space heating whereby valve 540 is activated to remove the cylinder from the condenser loop 530 but rather direct the heat to a dedicated heating circuit 510. The cool water from the common heat source 120 is circulated through the evaporator—similar to FIG. 6—where it provides a heat differential between the evaporator and the condenser. This heat differential provides heat into the condenser lip that then provides heat for space heating. The heat pump in this way is configured to use the common heat source to provide a source of heat for a dedicated heating circuit—such as a radiator circuit.

Figure 8:
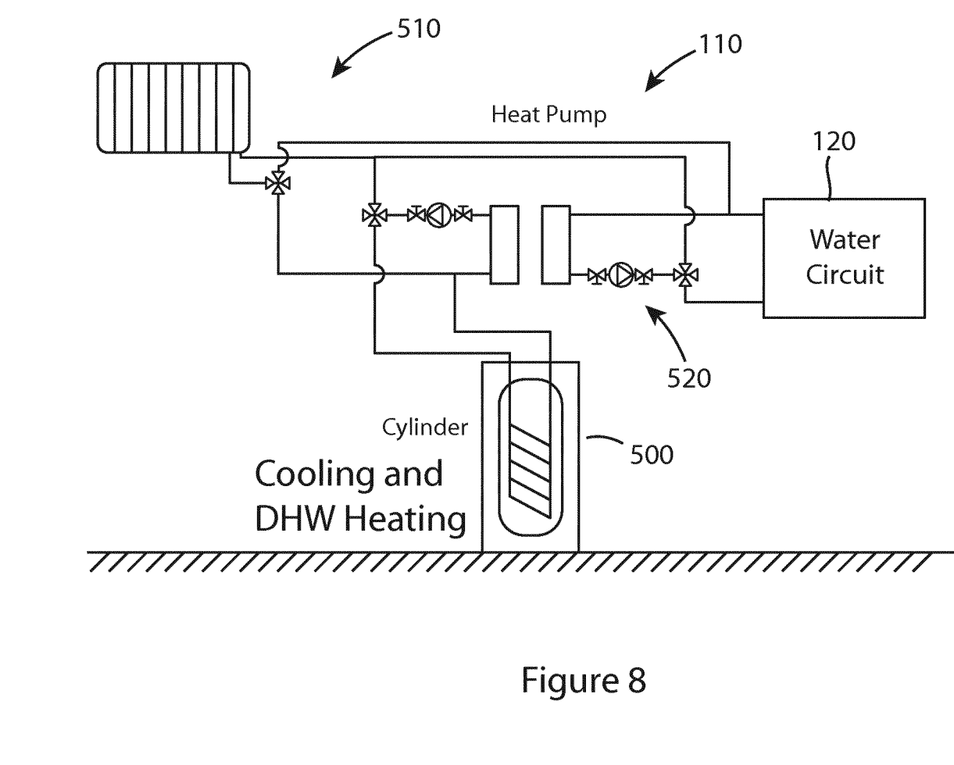
FIG. 8 is a schematic showing a plumbing network of an individual heat pump as coupled to a local load per the present teaching to provide both cooling and domestic hot water.

In a third mode shown in FIG. 8, the heat pump is isolated from the common heat source 120 but instead uses the space heating/cooling circuit 510 as a source of cooling for the evaporator. The space heating/cooling circuit comprises in this configuration localized cooling through one or more fan coils. The cooled liquid resultant from this cooling takes the effect of the cooled liquid that was provided by the water circuit in FIG. 6. The heat differential between the evaporator and condenser circuits provides a source of heating for the water in the cylinder 500. In this way, the heat that is generated by that localized cooling can be used to effect a heating of hot water for storage within the dedicated tank. In such an arrangement, if the volume of hot water generated is sufficient for the storage purposes then the excess heat can be diverted back into the common heat source. This can be done by use of separate valving or by providing a reversible heat pump whereby in certain configurations, the cooled liquid returned from the circuit 510 is provided on the condenser side of the heat pump- which in a reverse configuration functions as an evaporator. The water circuit 120 is coupled into the loop instead of the cylinder 500 which results in the excess heat being dumped back into the water circuit.

Figure 3:
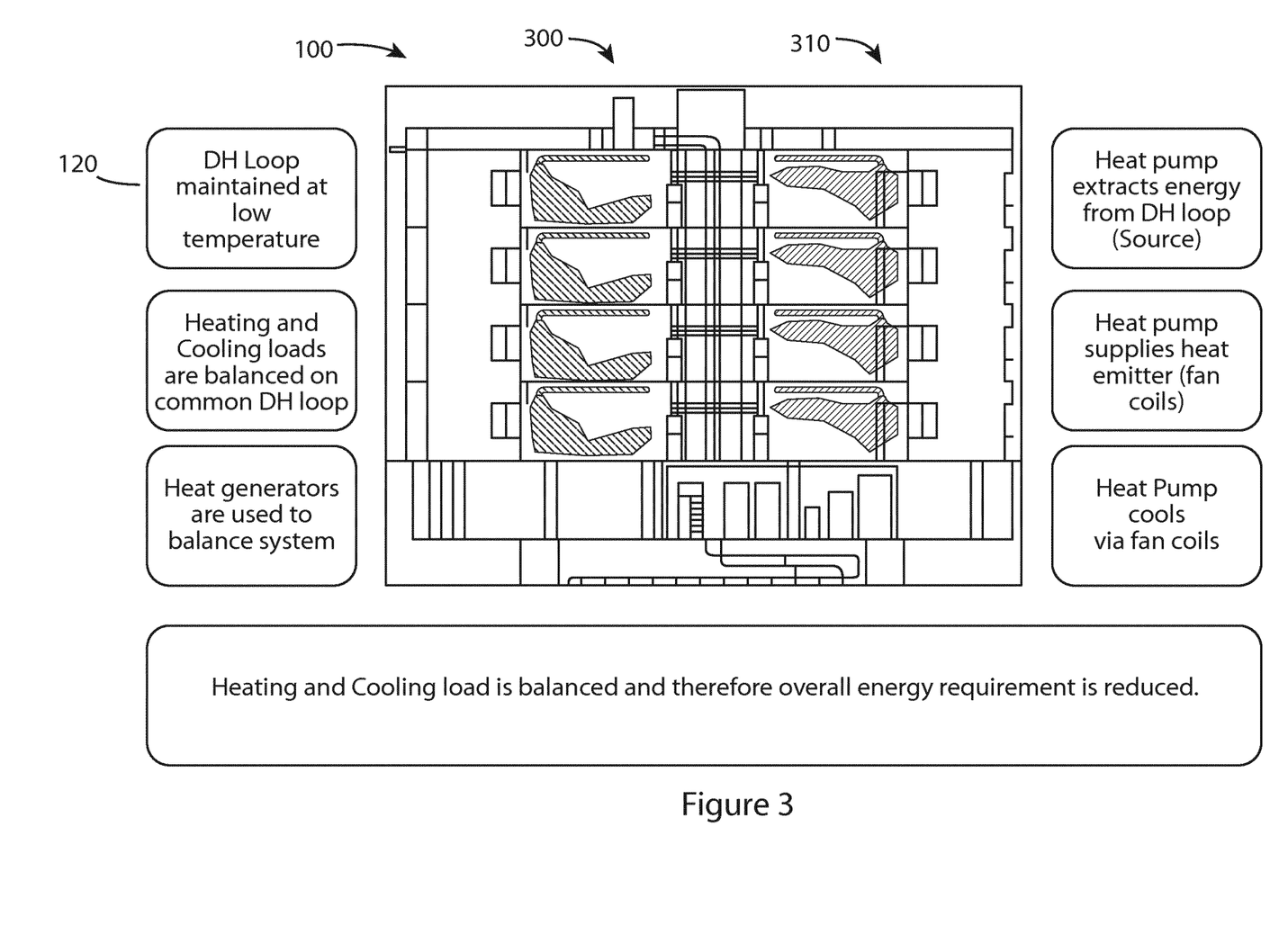
FIG. 3 is an example of the architecture of FIG. 1 operable in a heating and cooling configuration.

By providing a plurality of such heat pumps which have independent connections to the common heat source, excess heat from one heat pump can be diverted back into the common heat source circuit where it can be used as a source of heat for another different heat pump. An example of such a configuration-which will be appreciated is idealized for exemplary purposes- is shown in FIG. 3. The dwellings on the left hand side, LHS, 300 of the building 100 are arranged to have an active cooling and therefore are diverting excess heat into the circuit 120 whereas those dwellings on the right hand side, RHS, 310 are arranged in a heating configuration to take that heat and generate a heating within their local environment. The heat pumps within each dwelling on the right hand side 310 of the schematic extract heat from the common source 120 which is then used to supply heat via fan coils. The heat pump within each dwelling on the LHS is then cooled via the fan coils. The heating and cooling requirements within the overall network are balanced on the common source 120 which may be moderated or otherwise controlled by selective activation of heat generators 160, 170, 180, 190, 200, heat sinks 150, 130, 140 etc. By coupling the plurality of individual heat pumps into the network, the overall heating and cooling load is balanced and therefore the overall energy requirement for the building as a whole is reduced.

Figure 1:
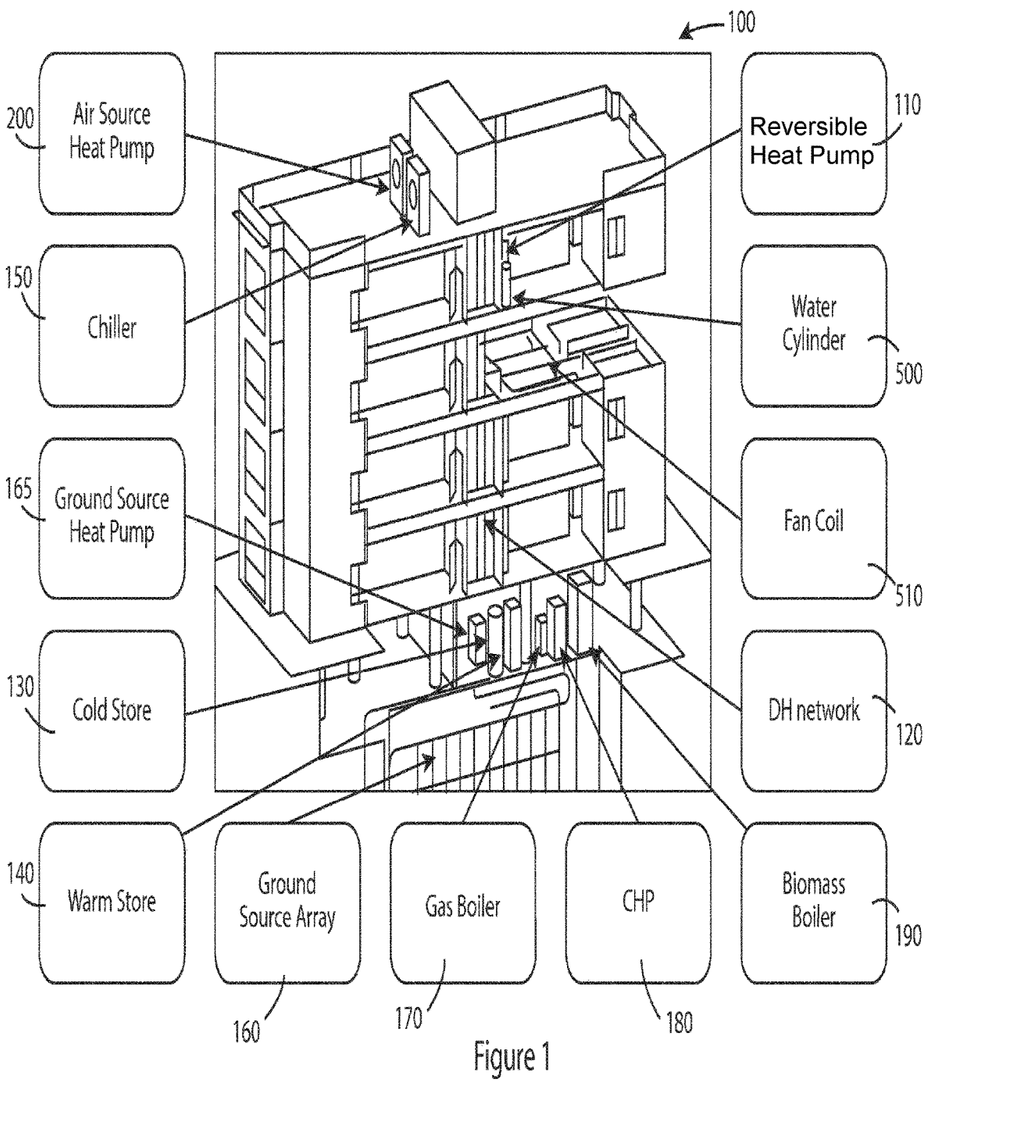
FIG. 1 is a schematic of an architecture including distributed heat pump network
Figure 2:
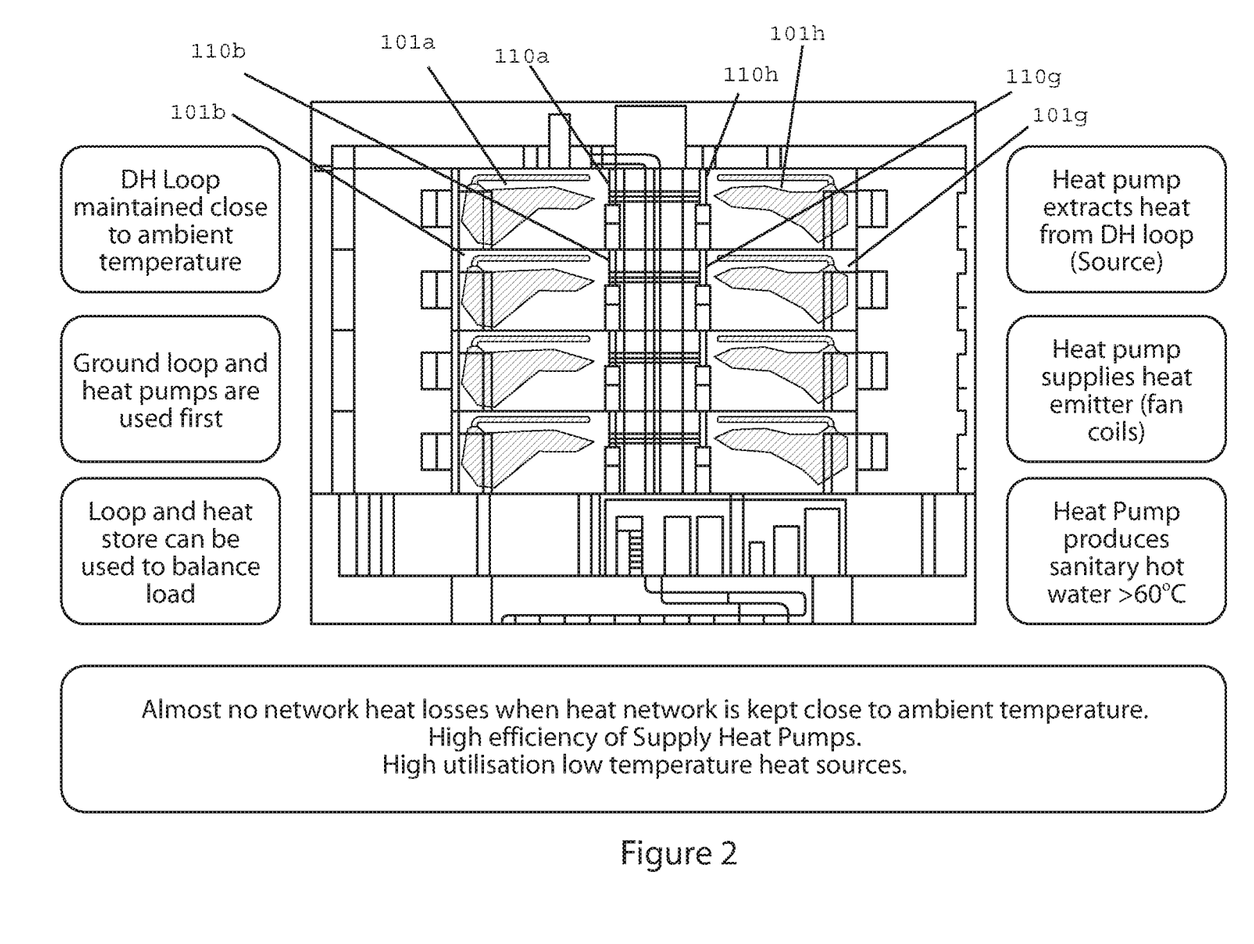
FIG. 2 is an example of the architecture of FIG. 1 operable in a heating load configuration.

In the example of FIG. 2, all dwellings are provided in space heating mode whereby the common source 120 is maintained close to ambient temperature through active management. This will advantageously use the ground loop and external heat pumps 200, 165 first. The loop 120 and the heat stores 130, 140 can be used to balance the load within the common source 120. Each individual heat pump 110 extracts heat from the loop of the common source 120 and supplies a local heat emitter which can be used for heating domestic hot water or space heating. In such an arrangement there is almost no network heat losses when heat network is kept close to ambient temperature resultant from the high efficiency of Supply Heat Pumps and the high utilization of low temperature heat sources. This maintenance of the temperature at ambient, or close to ambient temperature is achieved through active management of the common heat source. This may be achieved through a controller which periodically measures the temperature of the common source 120 and can be arranged to deliver energy to the common source to raise the temperature within that loop or to extract heat from the loop using the heat sinks. By decoupling the loop of the common heat source from heat generators and heat sinks, operation of the controller can selectively couple individual ones of the heat source and heat sink to maintain the temperature of the loop of the common source within a predetermined range.

The common source comprises a liquid circuit which comprises a flow circuit and a return circuit. The temperature of the flow circuit is maintained in a temperature range 10-30 degrees centigrade, desirably in a range 15-30 degrees centigrade and optimally in a range 15-25 degrees centigrade. The return circuit is maintained in a temperature range 5-25 degrees centigrade, desirably in a range 5-20 degrees centigrade and optimally in a range 10-20 degrees centigrade.

Figure 4:
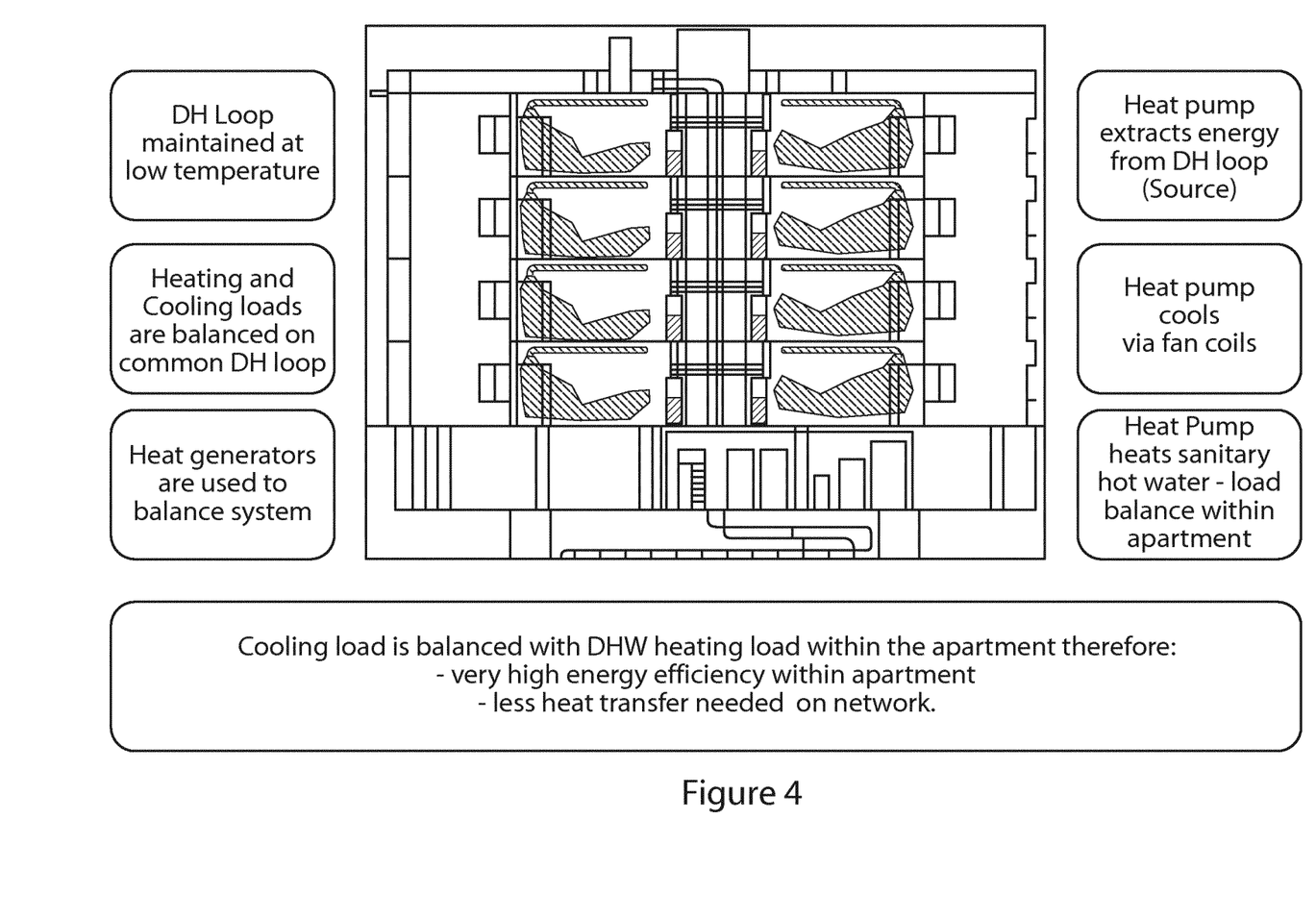
FIG. 4 is an example of the architecture of FIG. 1 operable in a cooling and domestic hot water heating configuration.
Figure 5:
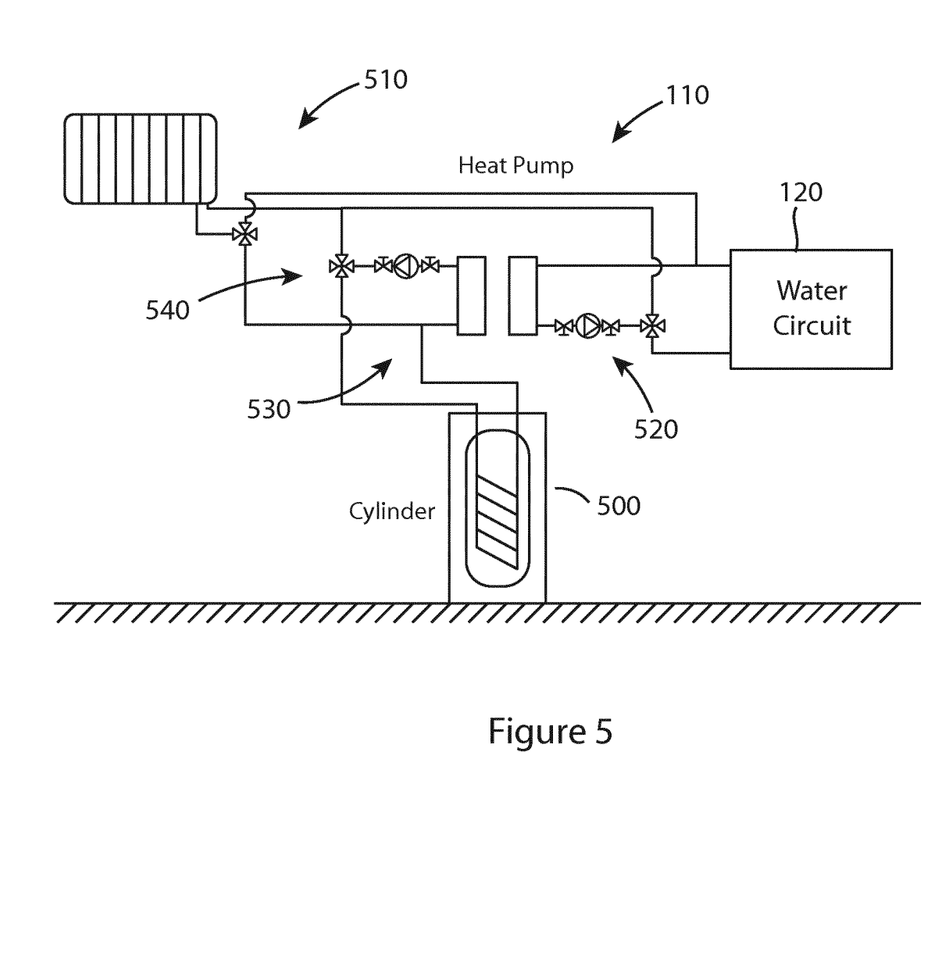
FIG. 5 is a schematic showing a plumbing network of an individual heat pump per the arrangement of FIG. 1, as coupled to a local load per the present teaching.

In the example of FIG. 4, which replicates the scenario of FIG. 8, the cooling load is balanced within each dwelling through a heating of the domestic hot water heating load in each cylinder. There is very high energy efficiency within each dwelling and as a result less heat transfer needed on network. Where required heating and cooling loads are balanced on the common heat source 120.

Figure 9:
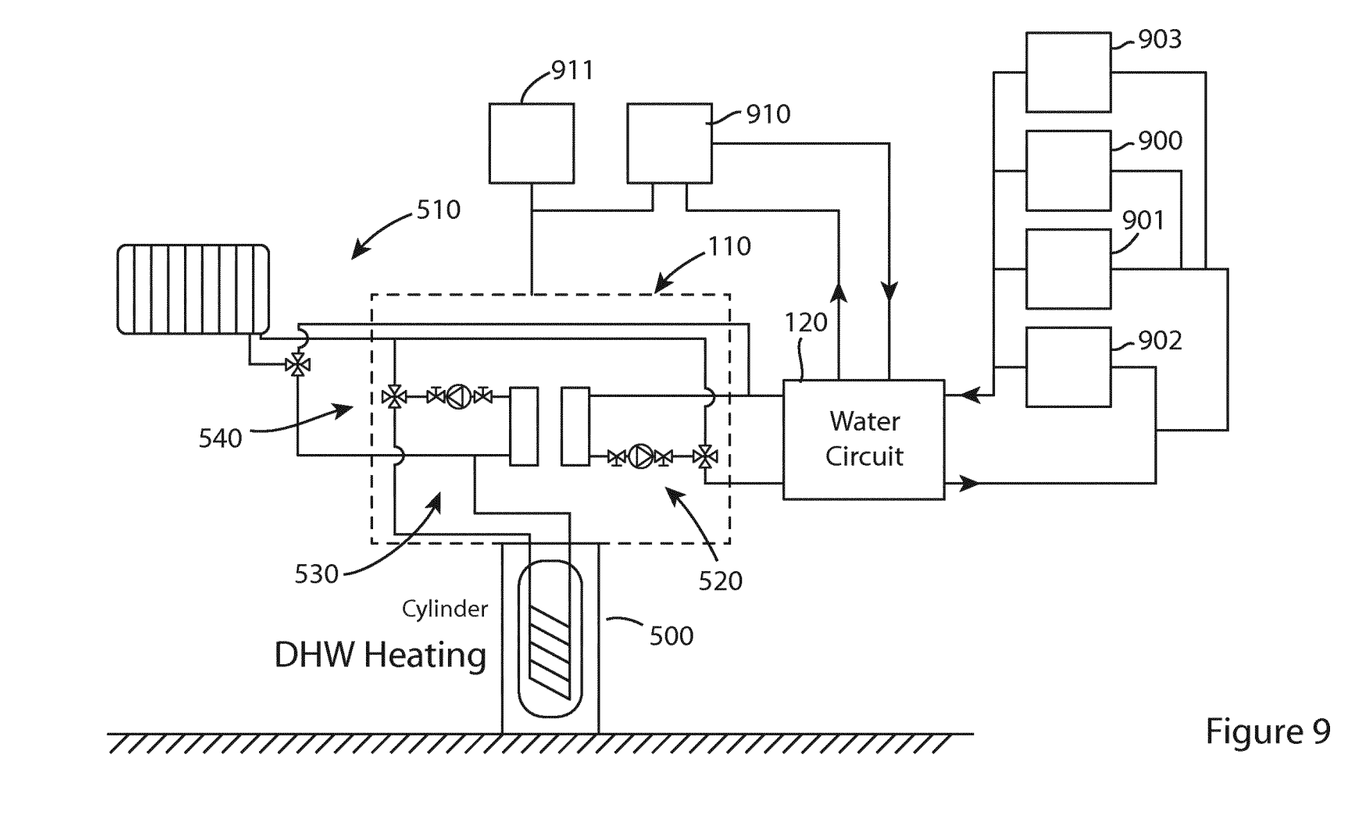
FIG. 9 shows a modification of the architecture described in the previous figures to show a standalone heat pump that is coupled to a common heat source that is fed from a plurality of heat sources.

Heretofore, each of the heat pumps have been described as being incorporated into a larger distributed heating network. It will be appreciated that the heat pumps can be advantageously deployed in environments that do not require such a distributed heat network. For example, as shown in FIG. 9, a heat pump such as that described previously with reference to FIG. 6, can be deployed in a standalone configuration. Such an arrangement can be usefully deployed in a residential environment, where the heat pump is used for single dwelling use.

Similar to previous aspects, in this arrangement the heat pump 110 is coupled to a common heat source 120 that may be selectively coupled to individual sources of energy 900, 901, 902, 903 for the heat pump. These individual sources of energy are desirably distinct and separate sources of energy. Examples of these individual sources of energy include solar thermal panels 900, air heat exchangers 901, a distributed heating network 902, ground water loops 903 and the like. These are examples of non-electrical sources of energy.

Where coupled to a distributed heating network 902, the distributed heating network may comprise a plurality of individual heat pumps, such as was described above. In such an arrangement, each heat pump of the distributed heating network may be individually coupled to the common heat source, each of the individual heat pumps being arranged to independently provide or extract heat from the common heat source.

The common heat source may be configured to allow a concurrent coupling of two or more of the individual sources of energy into the common heat source.

The heat pump may also be coupled to direct electrical sources such as PV panels, PVT panels 910, the electricity grid 911 or the like. The PV or PVT panels may be configured to provide electrical supply directly to the heat pump and/or a source of energy for the common heat source—which in this configuration is a water circuit 120.

The heat pump 110 may be integrated with a water cylinder 500, such as was described above. Other arrangements may also integrate the heat pump with a mechanical ventilation heat recovery (MVHR) system—not shown. Control systems may be provided which:
  Controls space heating
  Controls sanitary hot water production
  Controls MVHR system
  Monitors PV production
  Monitors electricity use of total house
  Optimizes local energy use of locally produced electricity
  Controls and manages a battery store
  Allows remote access to the controller
  Monitors all the equipment remotely
  Creates alarms if any system starts to perform outside of normal operating parameters
  Allows remote optimization of system performance In accordance with one aspect of the present teaching a controller which is configured to provide a user interface to effect control of the above elements may be provided.

A heat pump per the present teaching has many advantages over existing air source heat pumps including the fact that the:
  Heat pump can be within building
  Heat exchanger can be less visible or less intrusive than air source heat pump
  Heat pump is co-operable with the cylinder minimizes losses when hot water is produced, this heat pump may be provided above or below the actual cylinder.
  Heat pump within building envelope reduces losses in space heating mode—heat is generated where needed
  Small in size and therefore more flexibility in locating the heat pump
  If the property doesn't allow installation of a large enough ground loop, the energy from the ground loop can be combined with or supplemented by energy from other heat sources such as an air heat exchanger or solar thermal panel In summer solar thermal panels are providing hot water without heat pump, in winter when the energy from the solar thermal collectors is not sufficient to provide 60 C hot water they are used as energy collector for the heat pump Accordingly, a first embodiment of the application provides a heat pump as detailed in the claims presented herein. Advantageous embodiments are provided in the dependent claims. The present teaching also provides a heat pump network as detailed in the independent claim directed thereto.

The words comprises/comprising when used in this specification are to specify the presence of stated features, integers, steps or components but does not preclude the presence or addition of one or more other features, integers, steps, components or groups thereof.

The invention claimed is:

1. A distributed heating network,. comprising:
   a plurality of individual heat pumps, each heat pump individually coupled to a common heat source of the network, the common heat source of the network comprising a liquid loop within the network, a liquid of the loop being maintained at close to ambient temperature through active heat management of the common heat source, each heat pump being arranged to independently provide or extract heat from the common heat source, the common heat source being further coupled to at least one energy source;
   heat sinks configured to divert excess heat from the common heat source; and
   a controller configured to carry out the active heat management and measure a temperature of the common heat source, the controller being arranged, based on the measured temperature of the common heat source, to selectively deliver energy to the common heat source to raise the temperature within the liquid loop and extract heat from the liquid loop using the heat sinks to maintain the temperature of the liquid loop of the common heat source within a predetermined range which is independent of energy provided by the at least one energy source, thereby thermally decoupling the at least one energy source from the plurality of heat pumps.

2. The network of claim 1, wherein the common heat source comprises a liquid circuit, the liquid circuit comprising a flow circuit and a return circuit, a temperature of the flow circuit being maintained in a temperature range of 10-40 degrees centigrade.

3. The network of claim 2, wherein a temperature of the return circuit is maintained in a temperature range of 5-25 degrees centigrade.

4. The network of claim 1, wherein the at least one energy source comprises at least one non-electrical heat source.

5. The network of claim 4, wherein the at least one non-electrical heat source comprises a heat loop providing heat to the common heat source, and
   wherein a temperature of the heat loop is decoupled from the temperature of the common heat source.

6. The network of claim 1, wherein at least one of the individual heat pumps is coupled to a dedicated tank of domestic hot water such that heat from that the one of the individual heat pumps is used to provide a heating of water within the dedicated tank.

7. The network of claim 6, wherein each of the individual heat pumps is operable in a plurality of modes.

8. The network of claim 7, wherein, in a first one of the modes, the at least one of the individual heat pumps coupled to the dedicated tank is configured to use the common heat source to provide hot water which is then stored in the dedicated tank.

9. The network of claim 7, wherein, in a second one of the modes, one of the individual heat pumps is configured to provide space heating to use the common heat source to provide a source of heat for a dedicated heating circuit.

10. The network of any claim 7, wherein, in a third one of the modes, the at least one of the individual heat pumps coupled to the dedicated tank is configured to provide localized cooling through one or more fan coils to effect a heating of hot water for storage within the dedicated tank.

11. The network of claim 10, wherein the controller is configured to divert excess generated heat back into to the common heat source if a volume of the hot water generated is sufficient for the storage within the dedicated tank.

12. The network of claim 1, wherein at least one of the individual heat pumps is coupled to a dedicated heating/cooling circuit to provide localized heating or cooling from the one of the individual heat pumps.

13. The network of claim 1, wherein the heat pumps are reversible heat pumps.

14. The network of claim 1, wherein one of the individual heat pumps is configured to provide localized cooling.

15. The network of claim 1, wherein excess heat from one of the individual heat pumps is operably diverted back into the common heat source to be used as a source of heat for another one of the individual heat pumps.

16. The network of claim 1, wherein the at least one energy source comprises one or more heat source components coupled to the common heat source, and
   wherein the heat source components comprise a ground source array, gas or oil boilers, CHP plants, biomass boilers, air source heat pumps, or a combination thereof.

17. The network of claim 1, wherein the network is coupled to a wide area district heat network.

18. The network of claim 1, further comprising:
    a variable output heat pump.

* * * * *